United States Patent
Kwan-Bo

Patent Number: 5,812,280
Date of Patent: Sep. 22, 1998

[54] APPARATUS FOR DETECTING REMAINING SHEETS OF SUPPLIED PAPER IN FACSIMILE

[75] Inventor: Sim Kwan-Bo, Seoul, Rep. of Korea

[73] Assignee: LG Electronics Inc., Seoul, Rep. of Korea

[21] Appl. No.: 622,958

[22] Filed: Mar. 27, 1996

[30] Foreign Application Priority Data

Mar. 30, 1995 [KR] Rep. of Korea ............ 1995/7028
Mar. 22, 1996 [KR] Rep. of Korea ............ 1996/7941

[51] Int. Cl.$^6$ .................. H04N 1/00; B65H 7/02
[52] U.S. Cl. .................. 358/406; 358/296; 271/259; 271/265.04; 364/563
[58] Field of Search .................. 358/406, 498, 358/496, 497, 296, 442; 271/258.01, 258.02, 258.03, 258.04, 259, 265.04, 218; 355/408, 407, 112; 356/379, 381, 384; 364/481, 563, 564

[56] References Cited

U.S. PATENT DOCUMENTS

| 4,508,332 | 4/1985 | Nishio | 271/118 |
| 4,535,463 | 8/1985 | Ito et al. | 377/8 |
| 4,872,659 | 10/1989 | Kato et al. | 271/9 |
| 5,053,814 | 10/1991 | Takano et al. | 355/208 |
| 5,433,427 | 7/1995 | Ishikawa et al. | 271/126 |

FOREIGN PATENT DOCUMENTS

| 59-026838 | 2/1984 | Japan . |
| 63-185752 | 8/1988 | Japan . |
| 4-361934 | 12/1992 | Japan . |

*Primary Examiner*—Edward L. Coles
*Assistant Examiner*—Madeleine Anh-Vinh Nguyen
*Attorney, Agent, or Firm*—John P. White; Cooper & Dunham LLP

[57] ABSTRACT

An apparatus for detecting the remaining sheets of paper supplied in a facsimile, is disclosed including a supplier for supplying paper; a generator for generating a signal corresponding to the mounting of the supplier and the number of sheets of paper supplied; a detector for detecting the signal of the generator; a calculator for calculating the number of sheets of remaining paper according to a detection signal; and a display for displaying the number of sheets of remaining paper calculated in the calculator.

17 Claims, 6 Drawing Sheets

APPARATUS FOR DETECTING REMAINING SHEETS OF SUPPLIED PAPER IN FACSIMILE

BACKGROUND OF THE INVENTION

The present invention relates to a facsimile, and more particularly, to an apparatus for detecting the remaining sheets of supplied paper in a facsimile in which the sheets of paper remaining in its paper feeding cassette is detected.

Generally, a conventional facsimile consists of a detector for detecting whether its paper feeding cassette is mounted on the facsimile, and a sensor for deciding whether adequate sheets of paper is contained in the paper feeding cassette. In such a facsimile, paper is supplied to its paper feeding cassette when a user recognizes the remaining sheets of paper.

However, in case that documents are received, if the number of sheet of document transmitted is greater than the number of sheet of paper remaining in the paper feeding cassette, transmission of document is interrupted during transmission. This causes transmission of document not to be completed. In order to prevent this, the user must confirm the sheets of paper contained in the paper feeding cassette mounted on the facsimile. In addition, the conventional facsimile involves complicated manufacturing process, and requires a large amount of cost in manufacturing.

SUMMARY OF THE INVENTION

Therefore, in order to overcome such defects of the conventional facsimile, it is an object of the present invention to provide an apparatus for detecting sheets of paper remaining in a facsimile, in which a generator is given inside the supply means of the facsimile, and a detector being thereoutside, to thereby precisely detect the number of sheet of paper remaining in the paper feeding cassette, and display this state so that the user is allowed to easily recognize it.

To accomplish the object of the present invention, there is provided an apparatus for detecting the remaining sheets of paper supplied in a facsimile, the apparatus comprising: means for supplying paper; means for generating a signal corresponding to the mounting of the supply means and the number of sheets of paper supplied; means for detecting the signal of the generating means; means for calculating the number of sheets of remaining paper according to a detection signal; and means for displaying the number of sheets of remaining paper calculated in the calculation means.

BRIEF DESCRIPTION OF THE ATTACHED DRAWINGS

DETAILED DESCRIPTION OF PREFERRED EMBODIMENT

Figure 1:
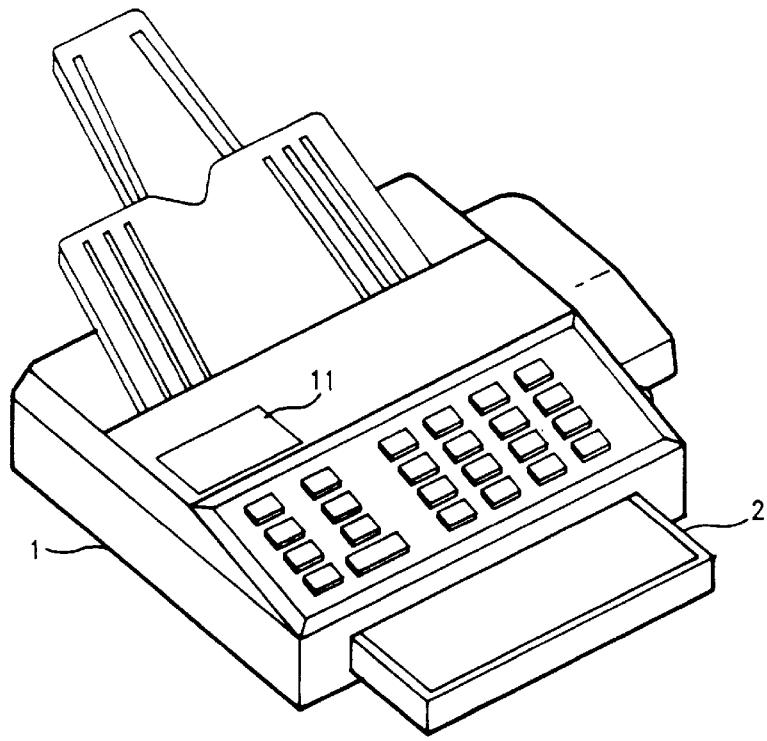
FIG. 1 is a perspective view of the present invention in which the coupling state of a facsimile and its paper feeding cassette is shown.
Figure 2:
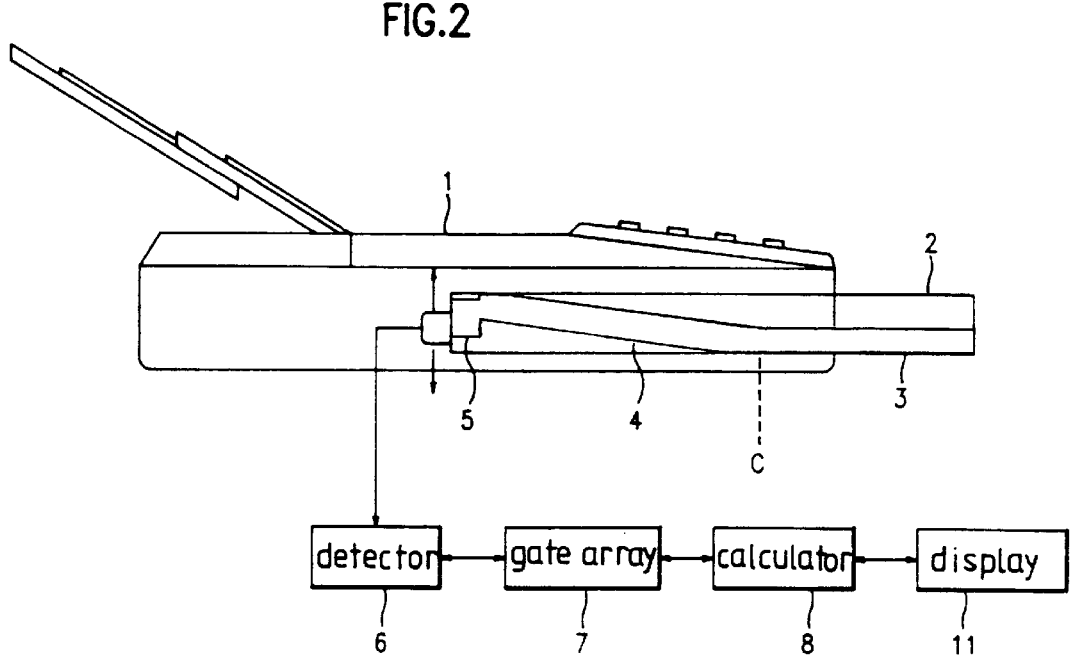
FIG. 2 is a side view of the present invention in which the coupling state of the facsimile and its paper feeding cassette is shown.
Figure 3:
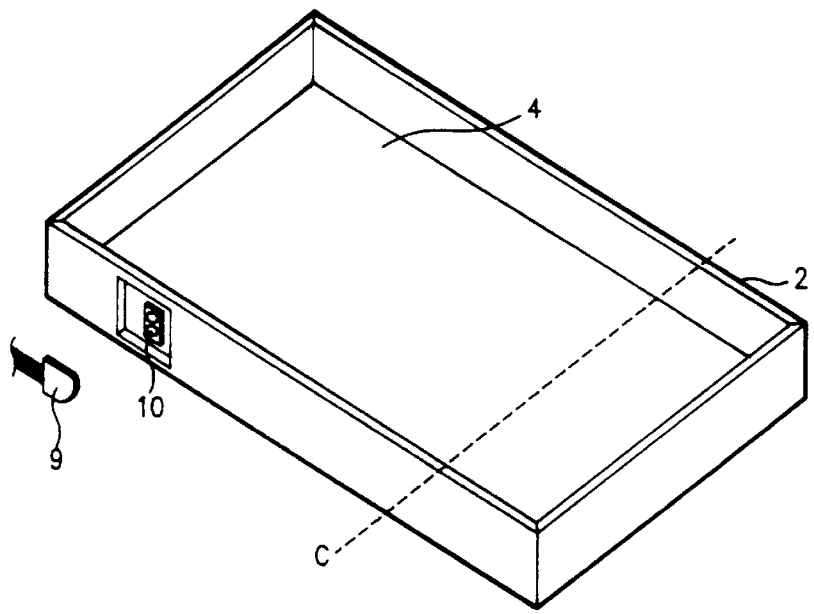
FIG. 3 is an exploded perspective view of the paper feeding cassette and hole sensor in the present invention.
Figure 4:
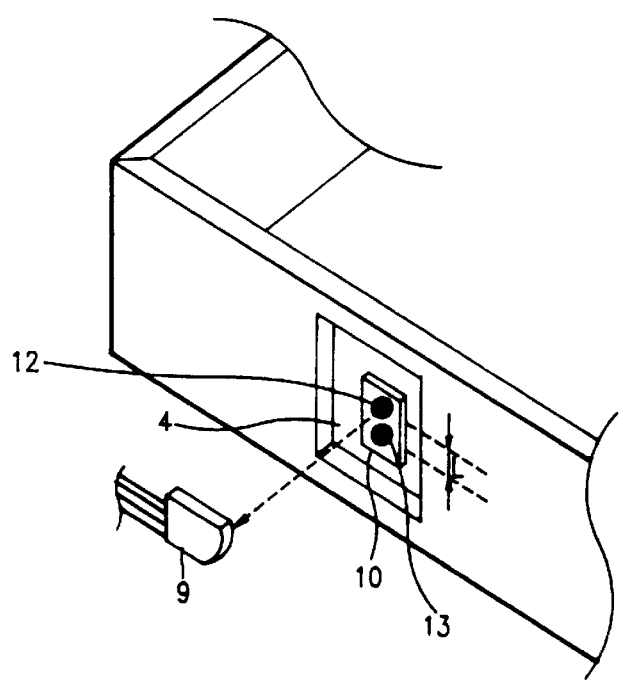
FIG. 4 is a partial perspective view of the paper feeding cassette and hole sensor in the present invention.

Hereinafter, preferred embodiments of the present invention will be described with reference to the attached drawings.

Referring to FIGS. 1–7B, and 9, an embodiment of the present invention comprises a facsimile body 1, a paper feeding cassette 2 coupled with facsimile body 1 for supplying paper 3 to the facsimile to thereby enable reception of document transmitted, a paper lifting plate 4 formed inside paper feeding cassette 2 and moving by the resilient force at the reference of paper lifting plate axis C, a generator 5 for generating a signal corresponding to the degree of resilient movement of paper lifting plate 4, a hole sensor 10, which is a detector 6, installed on the outer side of paper feeding cassette 2 opposite to generator 5 and for detecting a signal generated from generator 5 and converting it into a voltage level, a calculator 8 for detecting the mounting of paper feeding cassette 2, and calculating the number of sheets of paper supplied, the volume of paper remaining, the thickness of paper, and the number of sheets of remaining paper, and a display 9 for displaying data calculated in calculator 8.

Here, a hole greater than generator 5 is formed on a portion of one side of paper feeding cassette 2 so that the signal of generator 5 is externally transmitted. A gate array 7 is additionally provided to dispose the signals output from detector 6 in a predetermined way and transmit them to calculator 8. Generator 5 maintains a predetermined interval with detector 6, and has first and second magnets 12 and 13 which generate positive (N) and negative (S) fluxes of opposite polarities, respectively. First and second magnets 12 and 13 are disposed to be isolated from each other by an isolating member 10.

From now on, the operation of the apparatus of the present invention will be described with reference to FIGS. 8, 10, 11A and 11B.

First of all, when a user mounts paper feeding cassette 2 containing sheets of paper on the facsimile, a signal generated from generator 5 attached onto one side of paper lifting plate 4 installed inside paper feeding cassette 2 is transmitted externally via a hole formed on a portion of one side of paper feeding cassette 2. This signal is detected by hole sensor 9 of detector 6, and converted into a predetermined voltage level. Here, generator 5 produces a flux of a predetermined intensity from first or second magnet 12 or 13.

The voltage level detected initially is recognized in calculator 8 to judge that paper feeding cassette 2 is mounted.

When this state is displayed by display 11, the facsimile is ready for reception.

When a transmitter sends a document to a receiver facsimile, in case that the amount of paper 3 is sufficiently provided in paper feeding cassette 2 mounted on the receiver's facsimile body 1, paper 3 of paper feeding cassette 2 is input to the facsimile so that the reception of document is performed.

In other words, after the reception is ready, detector 6 installed inside facsimile body 1 senses the state in which paper feeding cassette 2 is mounted, and detects the flux signal of a predetermined magnitude generated from first magnet 12 in order to output a voltage level corresponding thereto. Here, it is assumed that detector 6 is on the same line to be opposite to first magnet 12.

The voltage level is sent via gate array 7, and causes calculator 8 to decide that the number of sheets of paper inserted into paper feeding cassette 2 is sufficient. By doing so, the reception operation starts to receive a document transmitted.

Figure 8:
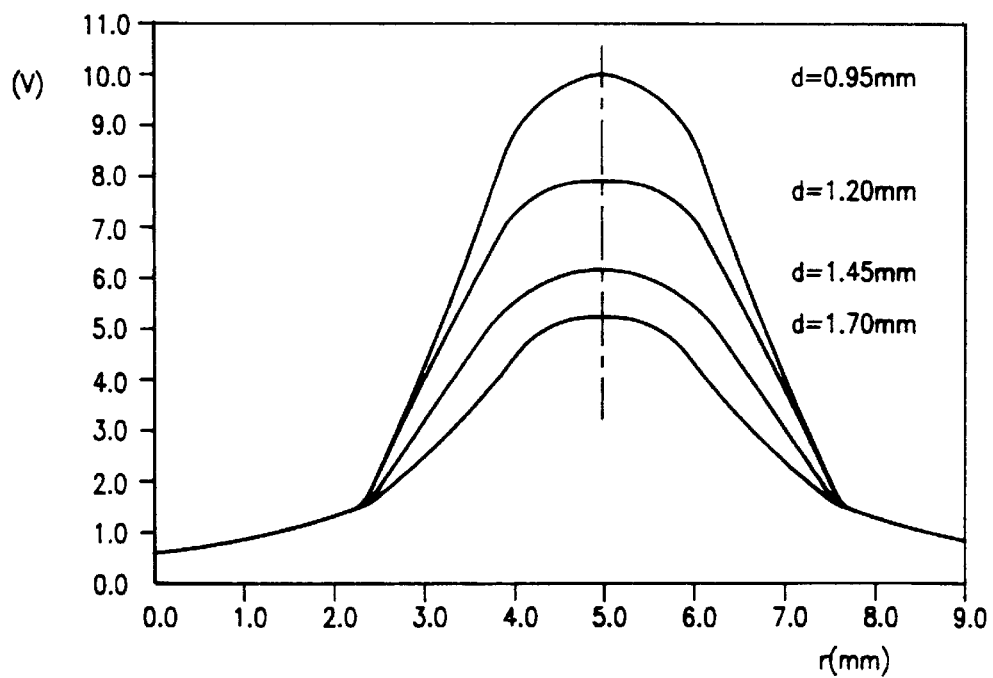
FIG. 8 is a graph for showing the characteristic curve of hole sensor experimental values, according to the present invention.
Figure 9:
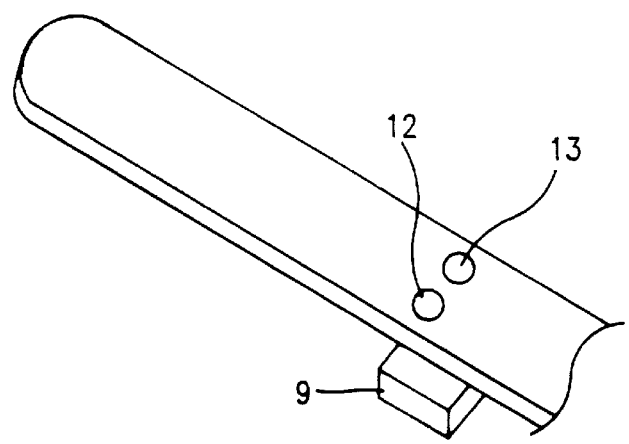
FIG. 9 is a perspective view of the present invention, which shows the distance between the hole sensor and magnet.

When paper lifting plate 4 elastic at the reference of paper lifting plate axis C moves up according to the number of sheets of paper contained in paper feeding cassette 2 and input to facsimile body 1, first magnet 12 of generator 5 installed inside paper feeding cassette 2 produces N-polarity flux signal of a predetermined intensity corresponding to the amount of paper input to the facsimile due to the resilient force generated by the elastic action of paper lifting plate 4. Here, the positive flux generated from first magnet 12 appears as the curve of positive voltage level by detector 6, as shown in FIG. 8. The negative flux generated from second magnet 13 appears as the curve of negative voltage level opposite to the curve of FIG. 8 but having the same magnitude.

Figure 10:
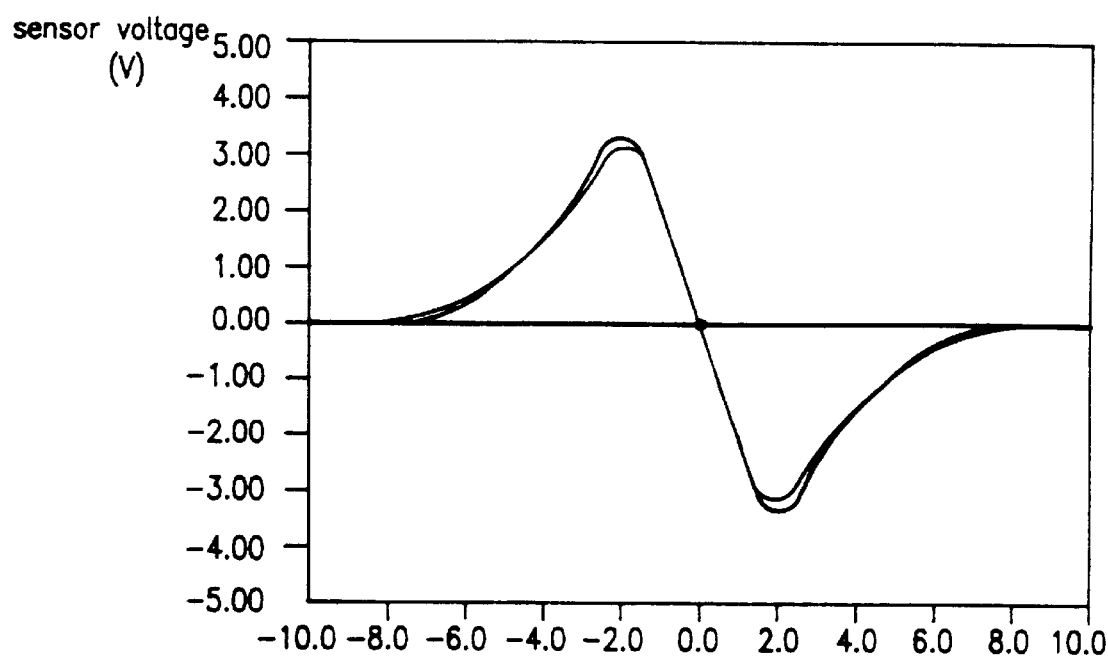
FIG. 10 is a graph for showing the output of the hole sensor according to the present invention.

When paper lifting plate 4 is continuously raised by the resilient force, and first magnet 12 of generator 5 is thus detached from detector 6 placed on the same line as the paper contained in paper feeding cassette 2 is input to facsimile body 1, detector 6 senses the negative flux signal of second magnet 13 placed at a predetermined interval with first magnet 12 as well as that of this first magnet so that they appear as voltage levels in accordance with the number of input sheets. Here, in detector 6, the variation states of voltage level by the flux signals of first and second magnets 12 and 13 are shown linearly from the positive voltage level to the negative voltage level, as depicted in FIG. 10. In other words, the linear function indicating the linear voltage levels is shown as follows, while the output voltages are converted into positive and negative voltage levels according to hole sensor of detector 6 and the N and S polarities of the flux between first and second magnets 12 and 13.

$$Y = A[e^{-\frac{1}{2}(x-d/r)/\sigma} - e^{-\frac{1}{2}(x-d/r)/\sigma}]$$

where A is a fixed vertical distance;

σ is a standard deviation of a corrected regulation distribution model;

X is the distance between the sensor and magnet; and r is a horizontal displacement.

It is noted that the horizontal displacement r of first and second magnets 12 and 13, and the distance d between first and second magnets 12 and 13 and hole sensor 9 vary with the intensity of flux of first and second magnets 12 and 13. This indicates that the distance formed between the magnets varies according to the intensity of different fluxes generated from first and second magnets 12 and 13.

Figure 5:
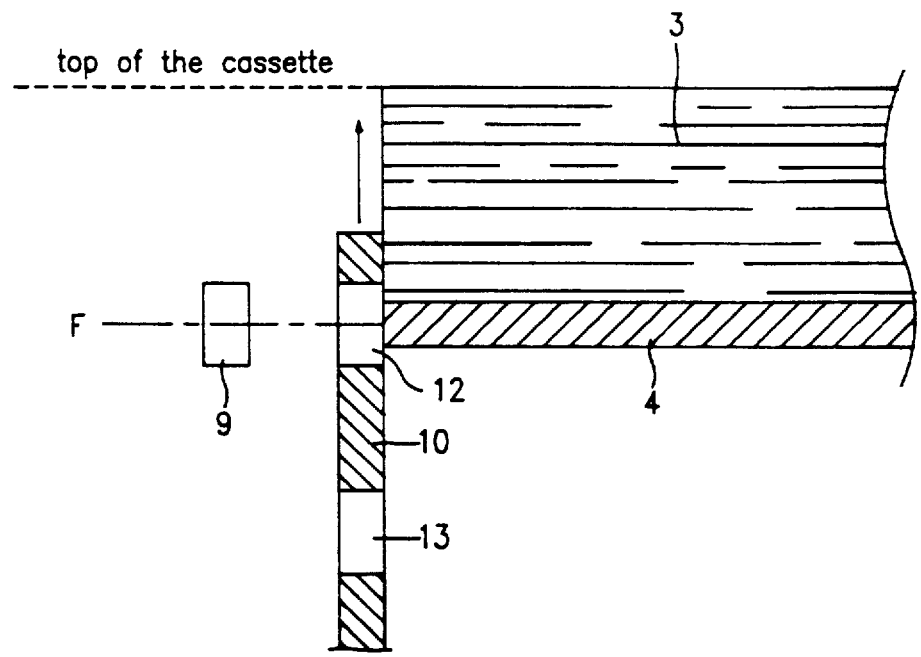
FIG. 5 is a sectional view of the paper feeding cassette and hole sensor when a large amount of paper is loaded, according to the present invention.

When paper feeding cassette 2 is inserted into facsimile body 1, first magnet 12 is placed on the same line as hole sensor 9, as shown in FIG. 5. Here, the voltage applied to detector 6 becomes $V_0$, as shown in FIG. 11B.

Figure 6:
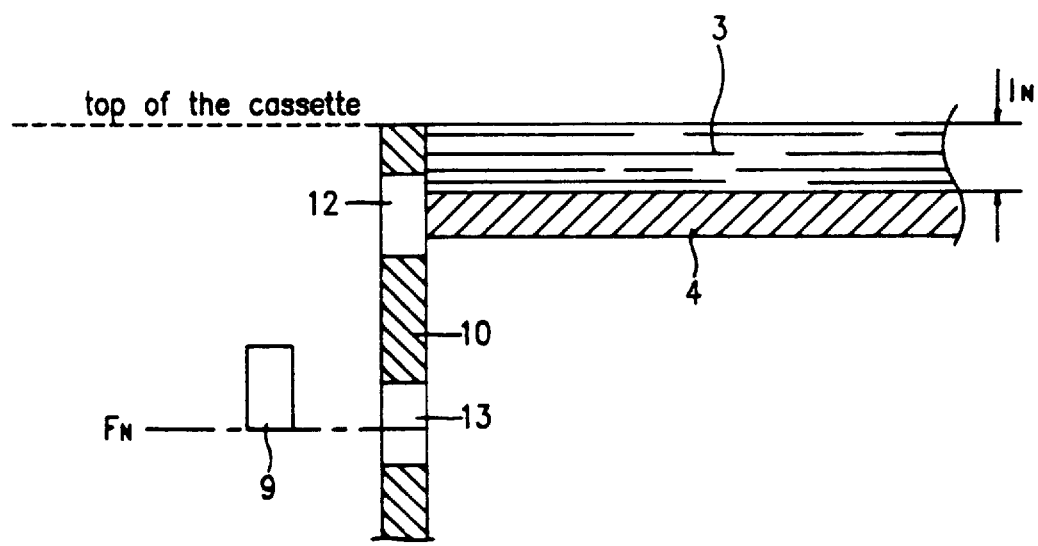
FIG. 6 is a sectional view of the paper feeding cassette and hole sensor when a small amount of paper is loaded, according to the present invention.
Figure 7A:
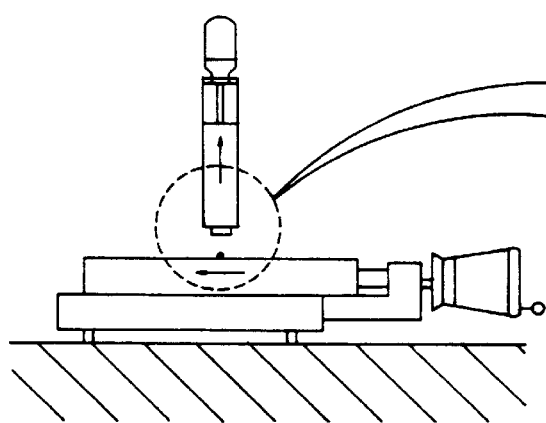
FIGS. 7A and 7B are sectional view of the present invention, which shows the distance between the hole sensor and magnet.
Figure 7B:
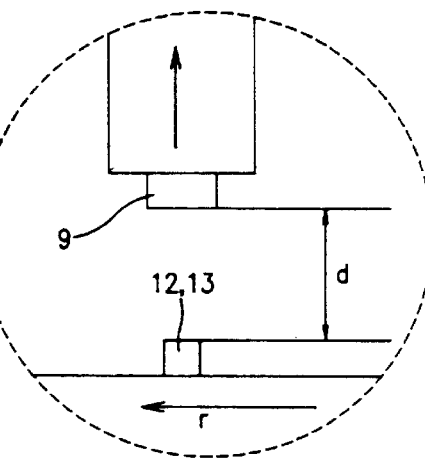

When the voltage $V_0$ is detected by detector 6, calculator 8 counts the number n of input sheets, and at the same time, as a predetermined number of sheets is input, detects voltage $V_N$ when paper lifting plate 4 is raised upto point $F_N$ as shown in FIG. 6. Therefore, the degree of variation of voltage level of detector 6 is calculated to obtain the number of sheet of input paper 3.

Figure 11A:
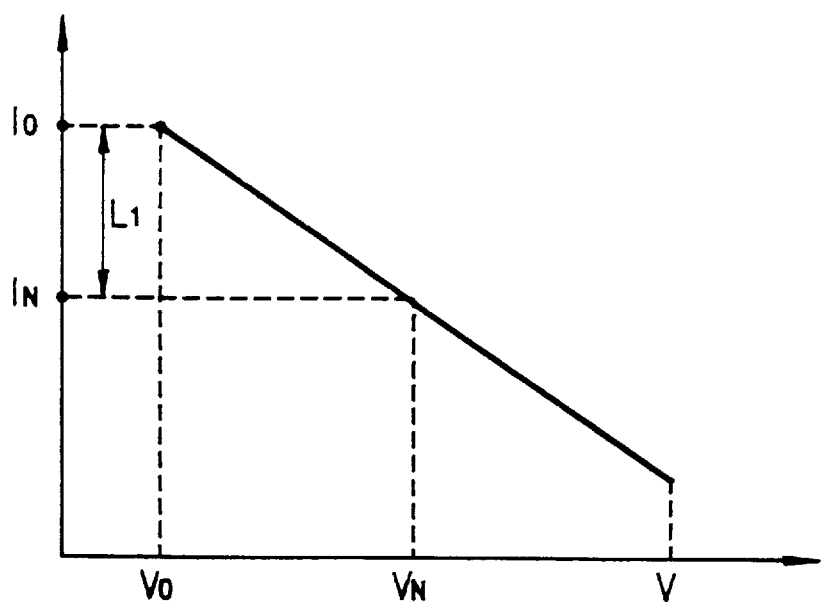
FIG. 11A is a graph for showing the correlation between voltage and paper thickness according to the present invention.
Figure 11B:
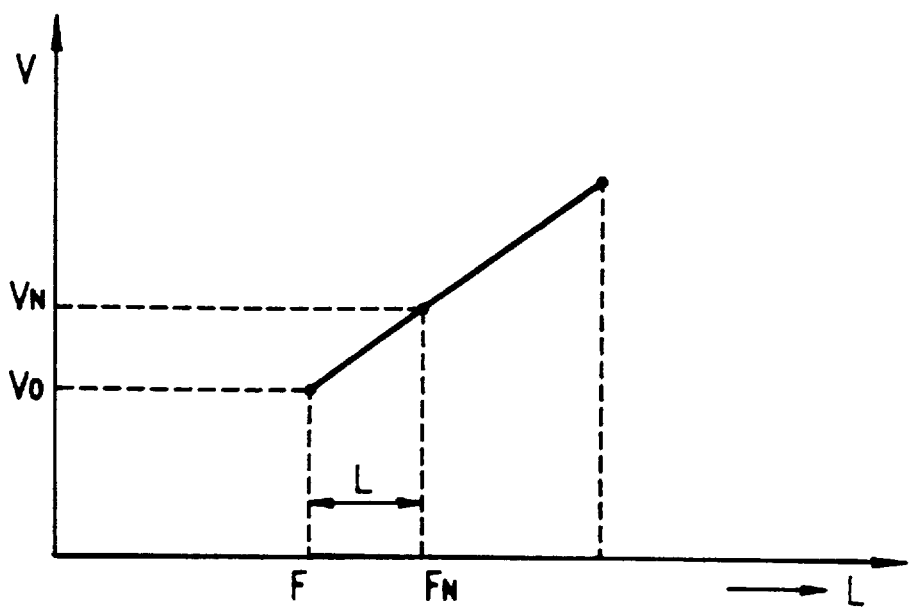
FIG. 11B is a graph for showing the correlation between voltage and detection position according to the present invention.

As shown in FIG. 11A, when voltage $V_0$ is applied, the volume of paper is $I_N$. When voltage $V_N$ is applied, the volume of paper is $I_N$. Here, if the number of sheet of input paper is $N_0$, the thickness t of paper input to the facsimile can be obtained as follows.

$$t = (I_0 - I_N)/N_0$$

As paper 3 is continuously input to facsimile body 1, calculator 8 continues to check how much paper inserted into paper feeding cassette 2 remains, and second magnet 12 gradually approaches hole sensor 9. With this, there can be obtained the volume $I_N$ of paper remaining in paper feeding cassette 2 in accordance with the voltage levels $V_0$–$V_N$ of detector 6. If volume $I_N$ is divided by thickness t of paper, the number N of sheet of paper 3 remaining in paper feeding cassette 2 can be obtained accurately.

$$I_N = t * N$$
$$N = I_N/t$$
$$= \frac{I_N * N_0}{I_0 - I_N}$$

The number N of sheet of remaining paper, the thickness t of paper, and the number $N_0$ of input paper are displayed on display 9 according to the user's selection.

If the number of sheet of currently remaining paper is below a predetermined value, display 11 displays a warning message to the user according to the calculator 8's command, and generates a specific sound, if necessary.

Meanwhile, in another embodiment of the present invention, data (for calculating the number of sheet of paper) transmitted from detector 6 is not calculated by calculator 8. In this case, the voltage signal of a predetermined level generated from detector 6 allows calculator 8 to recognize that paper is not sufficient in paper feeding cassette 2. Here, calculator 8 of this embodiment is made with a comparator (not shown).

As paper is supplied to facsimile 1, the paper lifting plate of paper feeding cassette 2 is gradually raised so that the flux generated from second magnet 13 of signal generator 5 is detected by detector 6, that is, hole sensor 9. Detector 6 detects the negative flux signal of second magnet 13 raised when paper is fed to facsimile 1 from paper feeding cassette 2. Here, the negative flux signal appears in a predetermined level.

This predetermined level is compared with a level set by calculator 8, and if greater therethan, a command to supply paper to paper feeding cassette 2 is output from calculator 8. According to this command, display 11 displays this state in order for the user to easily recognize it, or generates an alarm, if necessary. Other operations are performed in the same way as in the first embodiment.

As described above, the apparatus for detecting the remaining sheets of paper in a facsimile precisely calculates the number of sheet of paper remaining in the paper feeding cassette, and informs the user of the calculation result, to thereby previously prevent bad reception possibly generated during document reception, and allow the user to easily recognize the situation of facsimile.

What is claimed:

1. An apparatus for detecting the remaining sheets of paper supplied in a facsimile, said apparatus comprising:

means for supplying paper;

means for generating a signal corresponding to the mounting of said supply means and the number of sheets of paper supplied, wherein said generating means comprises a plurality of magnets for generating signals of different polarities;

means for detecting the signal of said generating means;

means for calculating the number of sheets of remaining paper according to a detection signal, wherein the calculating means calculates the volume, thickness and number of remaining sheets of paper supplied according to a variation amount of a linear voltage of said generating means; and means for displaying the number of sheets of remaining paper calculated in said calculating means.

2. An apparatus for detecting the remaining sheets of paper supplied in a facsimile, as claimed in claim 1, wherein said supply means internally has movement means indicative of movement corresponding to the number of sheets of remaining paper as paper is supplied to the facsimile.

3. An apparatus for detecting the remaining sheets of paper supplied in a facsimile, as claimed in claim 1, wherein said generating means is integrally formed in a portion of said movement means of said supply means.

4. An apparatus for detecting the remaining sheets of paper supplied in a facsimile, as claimed in claim 1, wherein said generating means is made with a plurality of signal generating means so that opposite signals are generated.

5. An apparatus for detecting the remaining sheets of paper supplied in a facsimile, as claimed in claim 1, wherein said supply means has a hole of a predetermined size on its one-side portion so that the signal of said generating means is transmitted externally.

6. An apparatus for detecting the remaining sheets of paper supplied in a facsimile, as claimed in claim 1, wherein said calculation means calculates the volume and thickness of paper supplied according to the variation amount of linear voltage level corresponding the movement of said movement means, to thereby find out the volume and the number of sheets of remaining paper.

7. An apparatus for detecting the remaining sheets of paper supplied in a facsimile, as claimed in claim 1, wherein said display means displays a warning message to a user, and if necessary, generates a specific sound, when the number of sheets of remaining paper is below a predetermined value.

8. An apparatus for detecting the remaining sheets of paper supplied in a facsimile, as claimed in claim 1, wherein said calculation means recognizes whether said supply means is mounted or not, by said detecting means.

9. An apparatus for detecting the remaining sheets of paper supplied in a facsimile, as claimed in claim 1, wherein said display means displays whether said supply means is mounted or not.

10. An apparatus for detecting the remaining sheets of paper supplied in a facsimile, said apparatus comprising:

means for supplying paper;

means for generating a signal corresponding to the mounting of said supply means and the number of sheets of paper supplied, wherein said generating means comprises a plurality magnets for generating signals of different polarities;

means for detecting the signal of said generating means;

means for deciding when paper is to be supplemented, according to a a variation amount of a linear voltage of said generating means; and means for displaying when paper is to supplemented by said deciding means.

11. An apparatus for detecting the remaining sheets of paper supplied in a facsimile, as claimed in claim 10, wherein said display means displays a warning message to a user and if necessary, generates a specific sound, when paper must be supplemented.

12. An apparatus for detecting the remaining sheets of paper supplied in a facsimile, as claimed in claim 10, wherein said supply means has a hole of a predetermined size on its one-side portion so that the signal of said generating means is transmitted externally.

13. An apparatus for detecting the remaining sheets of paper supplied in a facsimile, as claimed in claim 10, wherein said generating means is made with a plurality of signal generating means so that opposite signals are generated.

14. An apparatus for detecting the remaining sheets of paper supplied in a facsimile, as claimed in claim 10, wherein said supply means internally has movement means indicative of movement corresponding to the number of sheets of supplied paper.

15. An apparatus for detecting the remaining sheets of paper supplied in a facsimile, as claimed in claim 10, wherein said calculation means recognizes whether said supply means is mounted or not, by said detecting means.

16. An apparatus for detecting the remaining sheets of paper supplied in a facsimile, as claimed in claim 10, wherein said display means displays whether said supply means is mounted or not.

17. An apparatus for detecting the remaining sheets of paper supplied in a facsimile, said apparatus comprising;

a means for generating a signal corresponding to the number of sheets of paper supplied, wherein said generating means comprises a plurality of magnets for generating signals of different polarities; and a means for calculating the number of sheets of remaining paper by calculating the volume and thickness of the paper supplied and number of remaining sheets of paper according to a variation amount of a linear voltage of said generating means.

* * * * *